(12) United States Patent
Sakata

(10) Patent No.: US 9,022,426 B2
(45) Date of Patent: May 5, 2015

(54) STEERING DEVICE

(71) Applicant: JTEKT Corporation, Osaka-shi, Osaka (JP)

(72) Inventor: Toru Sakata, Katsuragi (JP)

(73) Assignee: JTEKT Corporation, Osaka (JP)

( * ) Notice: Subject to any disclaimer, the term of this patent is extended or adjusted under 35 U.S.C. 154(b) by 17 days.

(21) Appl. No.: 14/137,293

(22) Filed: Dec. 20, 2013

(65) Prior Publication Data

US 2014/0182410 A1 Jul. 3, 2014

(30) Foreign Application Priority Data

Dec. 27, 2012 (JP) .................................. 2012-285603

(51) Int. Cl.
*B62D 1/18* (2006.01)
*B62D 1/184* (2006.01)
*B62D 1/185* (2006.01)

(52) U.S. Cl.
CPC ...... *B62D 1/18* (2013.01); *B62D 1/184* (2013.01); *B62D 1/185* (2013.01)

(58) Field of Classification Search
CPC .......... B62D 1/18; B62D 1/184; B62D 1/185; B62D 1/187
USPC ............... 280/775, 779; 74/493, 495
See application file for complete search history.

(56) References Cited

U.S. PATENT DOCUMENTS

| | | | | |
|---|---|---|---|---|
| 4,981,049 A * | 1/1991 | Venable et al. | ................. | 74/493 |
| 5,222,410 A * | 6/1993 | Kinoshita | ........................ | 74/493 |
| 5,607,184 A * | 3/1997 | Barton | ........................... | 280/775 |
| 7,097,205 B2 * | 8/2006 | Camp et al. | ..................... | 280/775 |
| 7,434,841 B2 * | 10/2008 | Camp | ............................ | 280/777 |
| 7,886,631 B2 * | 2/2011 | Nashef et al. | ..................... | 74/493 |
| 2003/0172765 A1 * | 9/2003 | Heiml | ............................ | 74/493 |
| 2005/0029795 A1 * | 2/2005 | Camp et al. | ..................... | 280/777 |
| 2005/0173914 A1 * | 8/2005 | Sadakata et al. | ............... | 280/777 |
| 2005/0236825 A1 * | 10/2005 | Sawada et al. | ................. | 280/775 |
| 2006/0156856 A1 * | 7/2006 | Camp | ............................ | 74/493 |
| 2009/0114056 A1 * | 5/2009 | Nashef et al. | ..................... | 74/493 |
| 2011/0187089 A1 * | 8/2011 | Sakata | ........................... | 280/775 |
| 2011/0210537 A1 * | 9/2011 | Uesaka | .......................... | 280/775 |
| 2011/0210538 A1 * | 9/2011 | Warashina et al. | ............ | 280/775 |
| 2011/0259140 A1 * | 10/2011 | Fevre | ............................... | 74/493 |
| 2012/0234127 A1 * | 9/2012 | Okano et al. | ..................... | 74/493 |

FOREIGN PATENT DOCUMENTS

| | | |
|---|---|---|
| EP | 2 361 817 A2 | 8/2011 |
| JP | Y2-8-2024 | 1/1996 |

OTHER PUBLICATIONS

Extended Search Report issued in European Patent Application No. 13198832.1 dated Apr. 9, 2014.

* cited by examiner

*Primary Examiner* — Ruth Ilan
*Assistant Examiner* — Barry Gooden, Jr.
(74) *Attorney, Agent, or Firm* — Oliff PLC

(57) ABSTRACT

A steering device includes: a steering shaft; an inner jacket; a column jacket that includes an outer jacket that covers the inner jacket from outside, and supports the steering shaft; a movable bracket that is fixed to the inner jacket; a fixation bracket that has a retention portion, and is fixed to a vehicle body; and a press contact/release portion that brings a first plate-shaped region and a second plate-shaped region into press contact with each other along the plate thickness direction to press the first plate-shaped region and the second plate-shaped region against the retention portion, and releases the first plate-shaped region and the second plate-shaped region from a state of being in press contact with each other and a state of being pressed against the retention portion.

8 Claims, 5 Drawing Sheets

STEERING DEVICE

INCORPORATION BY REFERENCE

The disclosure of Japanese Patent Application No. 2012-285603 filed on Dec. 27, 2012 including the specification, drawings and abstract is incorporated herein by reference in its entirety.

BACKGROUND OF THE INVENTION

1. Field of the Invention

This invention relates to a steering device.

2. Description of Related Art

For example, a retractable steering column device disclosed in Japanese Examined Utility Model Application Publication No. 8-2024 has an outer column and an inner column that are combined with each other in a telescopic manner, and a lock housing that protrudes beside the outer column. A cylinder space is provided in the lock housing. A communication opening that establishes communication between the cylinder space and the interior of the outer column (an outer peripheral face of the inner column) is formed through a lateral face of the outer column, at a position matching the cylinder space.

A pair of first lock members and a second lock member are accommodated in the cylinder space. The pair of the first lock members assume the shape of a triangular prism, and face the outer peripheral face of the inner column from the communication opening, in a state of being arranged parallel to each other. The second lock member has a pair of inclined faces that extend in such a direction as to approach each other. Each of the inclined faces of the second lock member is in contact with a corresponding one of the first lock members. The second lock member thereby makes inroads into a space between the pair of the first lock members wedgewise, and presses each of the first lock members against the outer peripheral face of the inner column. Thus, the inner column is supported inside the outer column in an undisplaceable manner, and the position of the inner column and the outer column relative to each other is locked.

If the contact of the second lock member with the first lock members is weakened by operating an adjustment lever that is coupled to the second lock member, the force with which each of the first lock members is pressed against the outer peripheral face of the inner column is eliminated. Therefore, the inner column can be moved relatively to the outer column. Thus, the position of a steering wheel that is linked with the inner column can be adjusted.

SUMMARY OF THE INVENTION

In the retractable steering column device of Japanese Examined Utility Model Application Publication No. 8-2024, due to the configuration in which the second lock member makes inroads into the space between the pair of the first lock members wedgewise, a space for allowing the second lock member to make inroads must be secured downstream in the moving direction of the second lock member. Then, if an external force is abruptly applied to components around this space (the first lock members and the second lock member), the components can be displaced into the space. Therefore, the retractable steering column device may be bent in this space. This makes it difficult to increase the rigidity of the entire retractable steering column device.

Besides, in the configuration in which the second lock member makes inroads into the space between the pair of the first lock members wedgewise, contact faces of the first lock members and the second lock member are designed as inclined faces. However, it is difficult to regulate the accuracy of the angle of inclination of these inclined faces. If the accuracy of the angle of inclination of the inclined faces decreases, the first lock members are insufficiently in contact with the second lock member. If the first lock members are insufficiently in contact with the second lock member in the case where the first lock members move integrally with the inner column, the sliding resistance between the first lock members and the second lock member increases. In this state, the inner column is hindered from smoothly moving (in other words, the steering wheel is hindered from being smoothly adjusted in position). The contact faces of the first lock members and the second lock member may be unevenly worn, or the coating on the contact faces may peel off.

It is an object of this invention to provide a steering device that can be increased in rigidity and is easy to regulate.

A steering device according to an aspect of the invention includes: a steering shaft that has one end at which a steering member is mounted; a hollow inner jacket that accommodates the steering shaft and is able to move in an axial direction of the steering shaft; a column jacket that has a first plate-shaped region that extends parallel to the axial direction, includes an outer jacket that covers the inner jacket from outside, rotatably supports the steering shaft, and is adjustable at least either telescopically or tiltably; a movable bracket that has a second plate-shaped region that is arranged opposite the first plate-shaped region such that a direction of plate thickness of the first plate-shaped region is same as a direction of plate thickness of the second plate-shaped region, and is fixed to the inner jacket; a fixation bracket that has a retention portion that is arranged on an other side of the second plate-shaped region with respect to the first plate-shaped region, and is fixed to a vehicle body; and a press contact/release portion that brings the first plate-shaped region and the second plate-shaped region into press contact with each other along the plate thickness direction to press the first plate-shaped region and the second plate-shaped region against the retention portion, and releases the first plate-shaped region and the second plate-shaped region from a state of being in press contact with each other and a state of being pressed against the retention portion.

According to the foregoing aspect of the invention, in the steering device, when the press contact/release portion has released the first plate-shaped region and the second plate-shaped region from the state of being in press contact with each other and the state of being pressed against the retention portion, at least one of a telescopic adjustment and a tilt adjustment can be made. On the other hand, it is assumed that the press contact/release portion has pressed the first plate-shaped region (on the outer jacket side) and the second plate-shaped region (on the inner jacket side) against the retention portion (on the vehicle body side) along the plate thickness direction of each of the first plate-shaped region and the second plate-shaped region, while keeping the first plate-shaped region and the second plate-shaped region in press contact with each other along the plate thickness direction. In this case, no gap is created in a direction of application of a force from the press contact/release portion (in the plate thickness direction) between adjacent ones of the first plate-shaped region, the second plate-shaped region, and the retention portion. Therefore, the steering device whose posture is locked can be increased in rigidity. Besides, if the first plate-shaped region and the second plate-shaped region are simply pressed against the retention portion while being kept in press contact with each other along the plate thickness direction, these members can be easily regulated (the accuracies thereof can be easily regulated).

In the foregoing aspect of the invention, a support member that is provided on the outer jacket, and slidably supports the movable bracket from an orthogonal direction that is perpendicular to both the axial direction and the plate thickness direction may further be included.

According to the aforementioned configuration, the support member can restrain the movable bracket and the inner jacket from backlashing in the orthogonal direction.

In the aforementioned configuration, the support member may be provided on each of both sides of the movable bracket in the orthogonal direction.

According to the aforementioned configuration, the support member that is provided on each of both the sides of the movable bracket can further restrain the movable bracket and the inner jacket from backlashing in the orthogonal direction.

In the aforementioned configuration, a positioning portion that positions the support member with respect to the outer jacket may be included.

According to the aforementioned configuration, the positioning portion allows the support member to be accurately mounted to the outer jacket.

In the aforementioned configuration, the positioning portion may include a concave portion that is provided in the outer jacket and has a circularly dented cross-section, and a convex portion that is provided on the support member, has a circularly swollen cross-section, and is fitted in the concave portion.

According to the aforementioned configuration, the positioning portion can be simply constituted by the concave portion and the convex portion, each of which has a cross-section in the shape of a circular arc.

In the aforementioned configuration, an adjustment mechanism for adjusting a position of the support member relative to the movable bracket in the orthogonal direction may further be provided.

According to the aforementioned configuration, the adjustment mechanism adjusts the position of the support member, whereby the movable bracket and the inner jacket can further be restrained from backlashing in the orthogonal direction.

In the aforementioned configuration, the adjustment mechanism may include a threaded hole that is formed through the outer jacket, and a bolt that is assembled with the threaded hole and presses the support member from the threaded hole toward the movable bracket.

According to the aforementioned configuration, the adjustment mechanism can be simply constituted by the threaded hole of the outer jacket and the bolt that is assembled with this threaded hole to press the support member.

Incidentally, in the foregoing, the numerals and the like in the parentheses represent reference symbols of corresponding component elements in an embodiment of the invention that will be described later. However, these reference symbols are not intended to limit the claims.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein.

DETAILED DESCRIPTION OF EMBODIMENT

Figure 1:
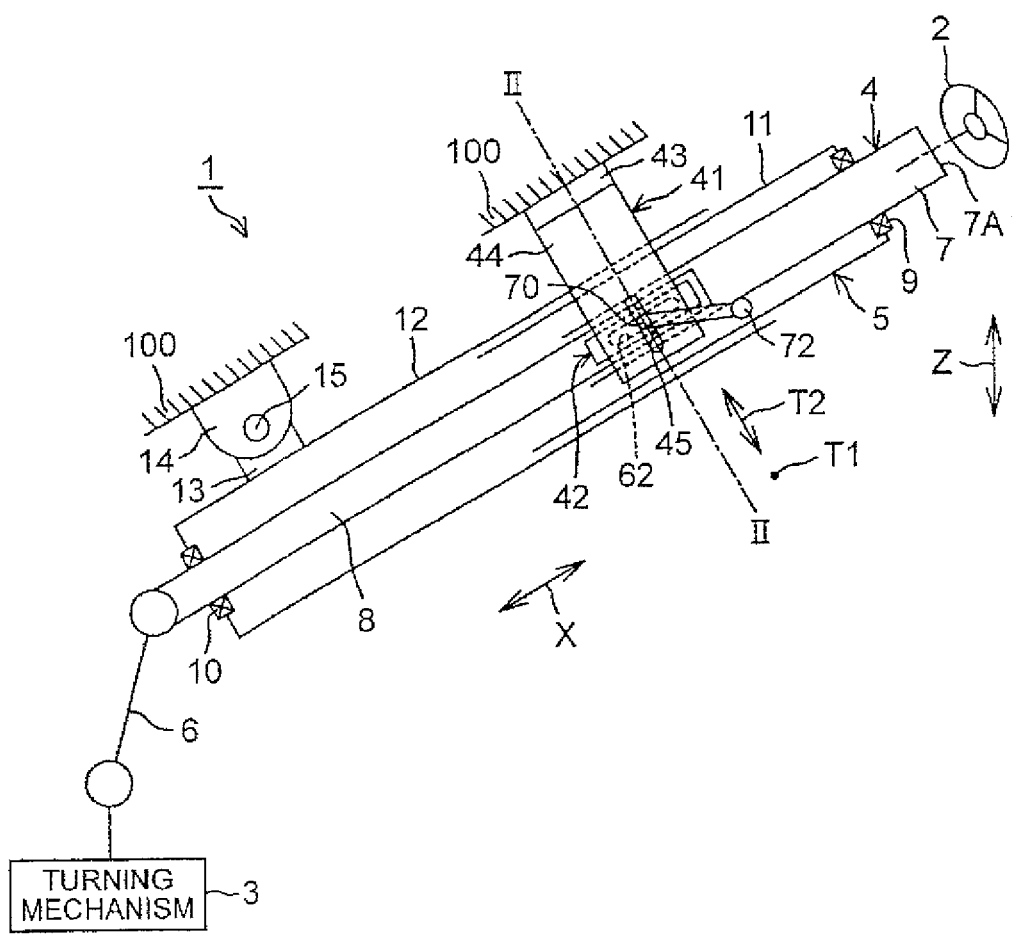
FIG. 1 is a schematic view of a general configuration of a steering device according to the embodiment of the invention.

The embodiment of the invention will be described with reference to the accompanying drawings. FIG. 1 is a schematic view of a general configuration of a steering device according to the embodiment of the invention. Incidentally, in FIG. 1, the left side of the sheet is a front side of a vehicle body 100 that is provided with a steering device 1, and the right side of the sheet is a rear side of the vehicle body 100. Besides, in FIG. 1, the upper side of the sheet is an upper side of the steering device 1, and the lower side of the sheet is a lower side of the steering device 1.

Referring to FIG. 1, the steering device 1 mainly includes a steering member 2 such as a steering wheel or the like, a turning mechanism 3 that turns turning wheels (not shown) in association with the steering of the steering member 2, a steering shaft 4, and a generally cylindrical column jacket 5. As the turning mechanism 3, for example, a rack-and-pinion mechanism is employed. The steering member 2 and the turning mechanism 3 are mechanically coupled to each other via the steering shaft 4, an intermediate shaft 6, and the like. A rotation of the steering member 2 is transmitted to the turning mechanism 3 via the steering shaft 4, the intermediate shaft 6, and the like. Besides, the rotation transmitted to the turning mechanism 3 is converted into an axial movement of a rack shaft (not shown). Thus, the turning wheels are turned.

The steering shaft 4 extends in such a manner as to be inclined rearward and upward with respect to a horizontal direction. The direction in which the steering shaft 4 extends is an axial direction X of the steering shaft 4. The steering shaft 4 has an upper shaft 7 and a lower shaft 8 that are relatively slidably fitted to each other in the axial direction X. In this embodiment of the invention, the upper shaft is cylindrical, the lower shaft 8 is inserted through the upper shaft 7 from a lower front side (see also FIG. 2, which will be described later), and the upper shaft 7 and the lower shaft 8 are, for example, spline-fitted or serration-fitted to each other.

The steering member 2 is mounted to an upper tip 7A of the upper shaft 7 (which is equivalent to one end of the steering shaft 4). Besides, the upper shaft 7 and the lower shaft 8 slide relatively to each other, whereby the steering shaft 4 can expand and contract along the axial direction X. Incidentally, the upper shaft 7 actually moves in the steering shaft 4. The steering shaft 4 is coaxially accommodated in the column jacket 5, and is rotatably supported by the column jacket 5 via a plurality of bearings 9 and 10.

The column jacket 5 includes an inner jacket 11 as an upper jacket, and an outer jacket 12 as a lower jacket. The inner jacket 11 and the outer jacket 12 are hollow, and are tubular in this embodiment of the invention. Incidentally, the outer jacket 12 may be partially notched, and may not partially be tubular (see FIG. 2, which will be described later). The inner jacket 11 is smaller in diameter than the outer jacket 12, and is coaxially inserted through a hollow region of the outer jacket 12 from an upper front side. Thus, the outer jacket 12 and the inner jacket 11 are relatively slidably fitted to each other in the axial direction X of the steering shaft 4.

The inner jacket 11 rotatably supports the upper shaft 7 via the bearing 9 at an upper end of the inner jacket 11. Besides, the inner jacket 11 is coupled to the upper shaft 7 via the bearing 9, and can move integrally with the upper shaft 7. The outer jacket 12 rotatably supports the lower shaft 8 via the bearing 10 at a lower end of the outer jacket 12. Besides, a lower column bracket 13 that extends upward is fixed to a lower end side of an outer peripheral portion of the outer jacket 12. The lower column bracket 13 is turnably supported via a tilt central shaft 15, by a lower fixation bracket 14 that is fixed to the vehicle body 100. Thus, the entire column jacket 5 (including the steering shaft 4 as well) can turn around the tilt central shaft 15. The turning of the column jacket 5 may be expressed as "tilting" below.

The entire column jacket 5 is turned (tilted) around the tilt central shaft 15, so that the gradient of the entire column jacket 5 with respect to the horizontal direction is adjusted. Due to this adjustment (tilt adjustment), the position of the steering member 2 in a height direction Z (which is equivalent to a tilt direction of the column jacket 5) can be adjusted. In the column jacket 5, the position of the outer jacket 12 (in the axial direction X) that is supported by the lower fixation bracket 14 is fixed, and while being accompanied by the upper shaft 7, the inner jacket 11 can move (can slide) relatively to the outer jacket 12 in the axial direction X. Due to the relative movement of the inner jacket 11, each of the column jacket 5 and the steering shaft 4 can expand and contract in the axial direction X. The expansion and contraction in this case may be expressed as "telescopic movements" below. By adjusting the expansion/contraction amount of the column jacket 5 (including the steering shaft 4 as well), a telescopic adjustment can be made. Due to the telescopic adjustment, the position of the steering member 2 in the axial direction X can be adjusted.

Figure 2:
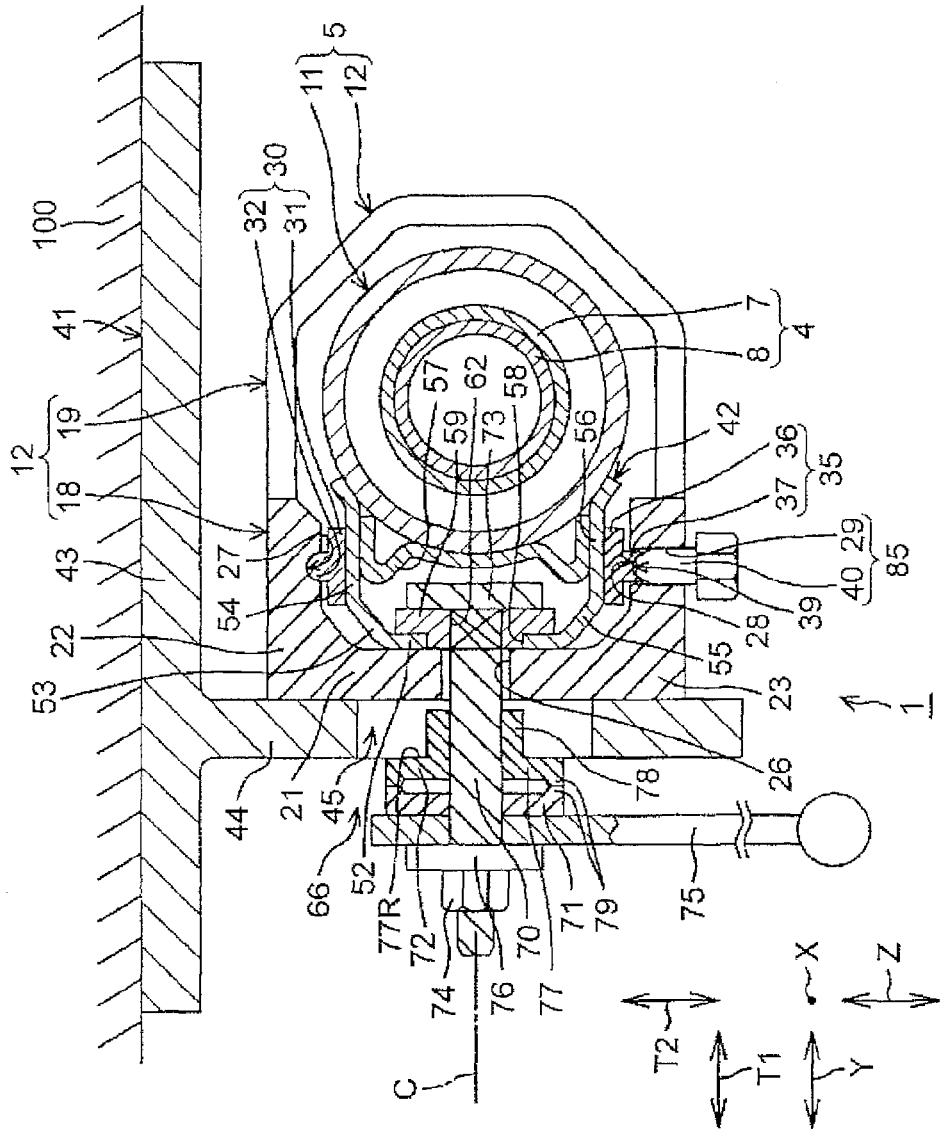
FIG. 2 is a cross-sectional view of a cross-section taken along a line II-II of FIG. 1.
Figure 3:
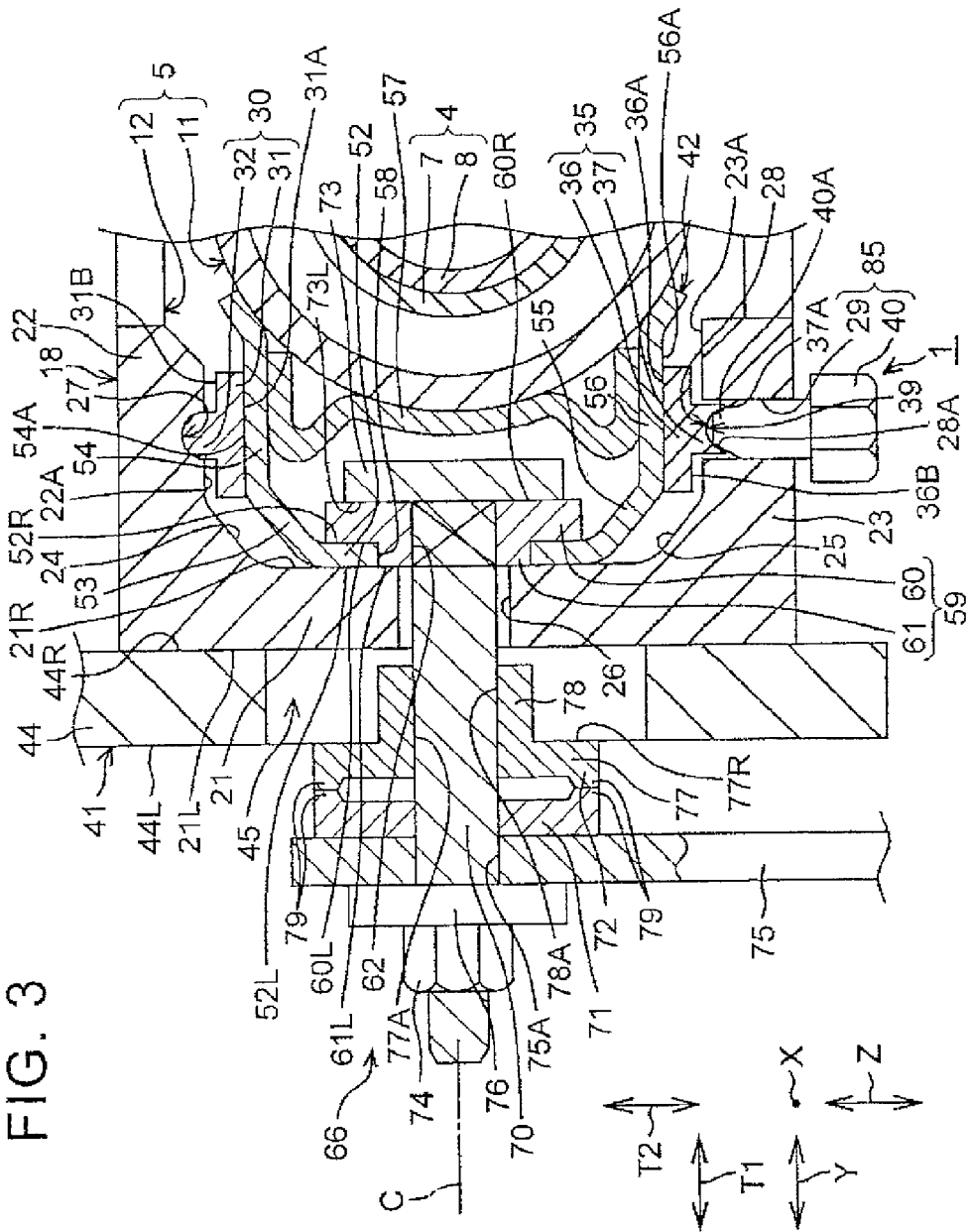
FIG. 3 is an enlarged view of an essential part of FIG. 2.
Figure 4:
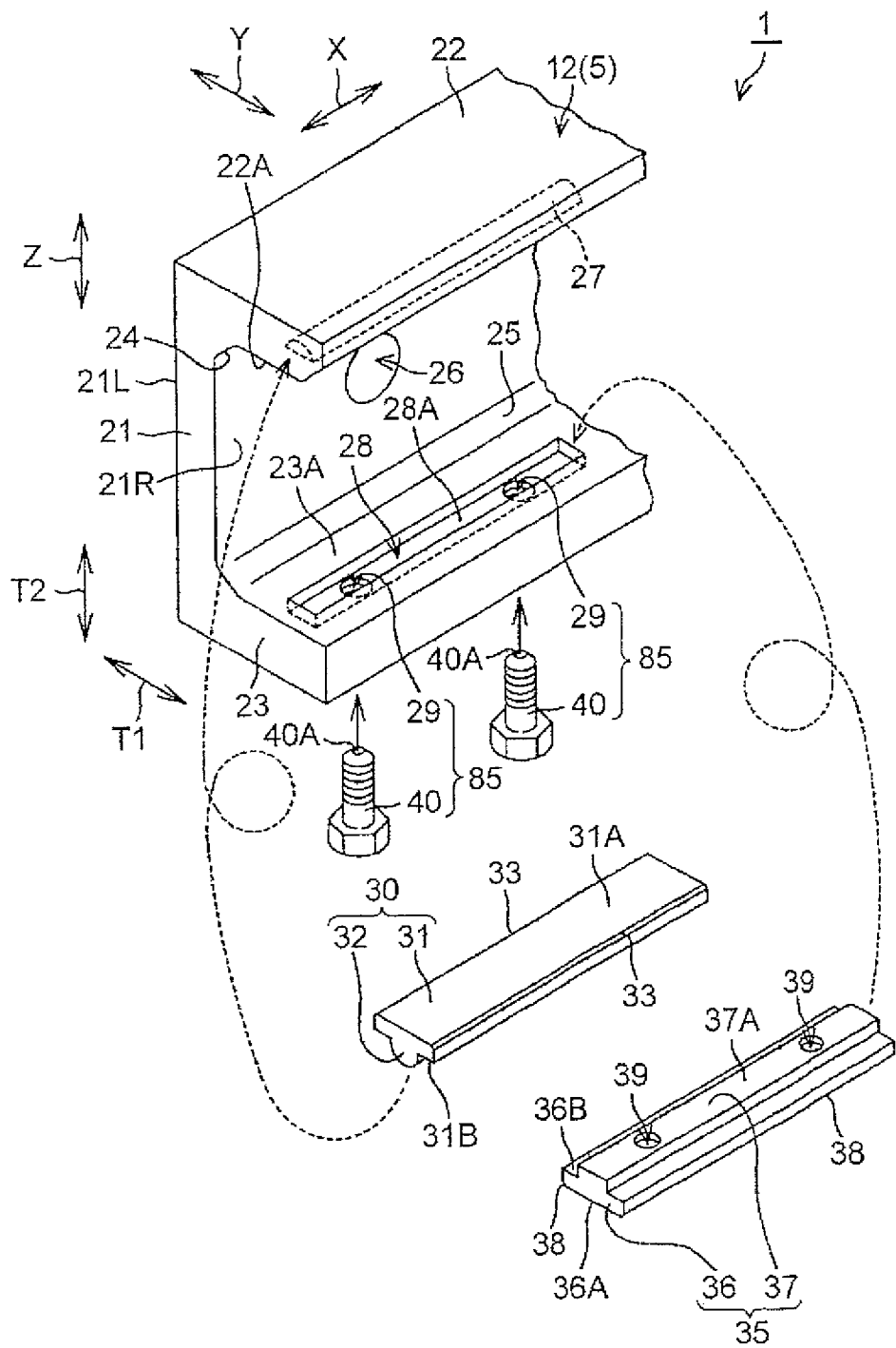
FIG. 4 is an exploded perspective view of an essential part in the steering device.

In this manner, the column jacket 5 can be telescopically and tiltably adjusted. FIG. 2 is a cross-sectional view of a cross-section of FIG. 1 taken along a line II-II. FIG. 3 is an enlarged view of an essential part of FIG. 2. FIG. 4 is an exploded perspective view of an essential part in the steering device 1. It should be noted herein that FIGS. 2 and 3 are views as viewed from a user that operates the steering member 2. The vertical direction (the height direction Z) of FIG. 1 is identical to the vertical direction of FIGS. 2 and 3. The following description will be given using the vertical and lateral directions in FIGS. 2 and 3 as well as the vertical and longitudinal directions in FIG. 1 as references. Besides, plate-shaped members will be described below. The plate thickness direction of the plate-shaped members consists of a first plate thickness direction T1 along a lateral direction Y, and a second plate thickness direction T2 along the vertical direction. In FIG. 2, the first plate thickness direction T1 and the second plate thickness direction T2 are perpendicular to each other. In this embodiment of the invention, the second plate thickness direction T2 may not be along the vertical direction, may be inclined to a certain extent toward the axial direction X side with respect to the vertical direction, and may not completely coincide with the height direction Z (see FIG. 1). In a narrow sense, the second plate thickness direction T2 is an orthogonal direction that is perpendicular to both the axial direction X and the first plate thickness direction T1.

Referring to FIGS. 2 and 3, the outer jacket 12 will be described in detail. Incidentally, among reference symbols of the members that will be described below, those which are not shown in FIG. 2 are shown in FIG. 3. The outer jacket 12 is generally tubular, and integrally has a left region 18 and a right region 19 with respect to a state of FIG. 2. The left region 18 has a generally U-shaped cross-section that is inclined rightward by 90°. The right region 19 has a generally U-shaped cross-section that is inclined leftward by 90°. The left region 18 and the right region 19 are fitted to each other, whereby a generally circular cross-section of the outer jacket 12 is formed. In addition, the inner jacket 11 (including the steering shaft 4 as well) is accommodated inside the outer jacket 12. That is, the outer jacket 12 covers the inner jacket 11 from outside. However, as described above, the outer jacket 12 is partially notched, and has a region that is partially not tubular. FIG. 2 shows the cross-section (a hatched region) of the outer jacket 12 in a region where only the left region 18 exists. Incidentally, the right region 19 shown in FIG. 2 does not exist on the same plane as the left region 18 hatched in FIG. 2, and the right side of the left region 18 is opened. Therefore, that region of the outer jacket 12 which is shown in cross-section in FIG. 2 covers the inner jacket 11 from outside (from an outer left side) only in the left region 18.

The left region 18 integrally has a first plate-shaped region 21 that assumes the shape of a plate extending in the height direction Z, an upper guide portion 22 that extends rightward from an upper end of the first plate-shaped region 21, and a lower guide portion 23 that extends rightward from a lower end of the first plate-shaped region 21. The first plate-shaped region 21 extends parallel to the axial direction X (a direction perpendicular to the sheet of FIG. 2), and is thin in the lateral direction Y. That is, the plate thickness direction of the first plate-shaped region 21 is the first plate thickness direction T1 that extends in the lateral direction Y. Referring to FIG. 3, both a left lateral face 21L and a right lateral face 21R of the first plate-shaped region 21 are flat along the axial direction X and the height direction Z. The upper guide portion 22 and the lower guide portion 23 are thin in the second plate thickness direction T2, and are parallel to each other. That is, the plate thickness direction of each of the upper guide portion 22 and the lower guide portion 23 is the second plate thickness direction T2. Both a lower face 22A of the upper guide portion 22 and an upper face 23A of the lower guide portion 23 are flat along the axial direction X and the lateral direction Y. A left end of the lower face 22A of the upper guide portion 22 and an upper end of the right lateral face 21R of the first plate-shaped region 21 are coupled to each other by an upper inclined face 24 that extends rightward and upward. A left end of the upper face 23A of the lower guide portion 23 and a lower end of the right lateral face 21R of the first plate-shaped region 21 are coupled to each other by a lower inclined face 25 that extends rightward and downward.

Besides, a round insertion hole 26 that penetrates the first plate-shaped region 21 in the lateral direction Y (the first plate thickness direction T1) is formed through the first plate-shaped region 21 substantially at a center thereof in the second plate thickness direction T2 (see FIG. 4 as well). A concave portion 27 (a positioning portion) that is dented upward (upward in the second plate thickness direction T2 in a narrow sense) is provided in the lower face 22A of the upper guide portion 22. The concave portion 27 assumes the shape of a groove that is longitudinal in the axial direction X (see FIG. 4). As shown in FIG. 2, when cut along a plane that is perpendicular to the axial direction X, the concave portion 27 has a cross-section that is dented upward in the shape of a circular arc.

A support member 30 is mounted in the concave portion 27. The support member 30 constitutes part of the steering device 1, and is provided on the outer jacket 12. Referring to FIG. 4, the support member 30 assumes the shape of a block that integrally has a body portion 31 and a convex portion 32 (a positioning portion). The body portion 31 has a rectangular cross-section that is flat in the plate thickness direction of the upper guide portion 22 (the second plate thickness direction T2), and assumes the shape of a plate that is longitudinal along the axial direction X. The body portion 31 has a sliding face 31A and an opposed face 31B. The sliding face 31A and the opposed face 31B assume the shape of an oblong that is longitudinal along the axial direction X, and extend parallel to each other while being spaced apart from each other in the second plate thickness direction T2. As shown in FIG. 4, the sliding face 31A is arranged above the opposed face 31B. Chamfer regions 33 that are inclined with respect to the sliding face 31A are provided at both ends of the sliding face 31A (in the short direction thereof) respectively. The convex portion 32 is provided on the opposed face 31B over an entire area in the longitudinal direction thereof, at a substantially central position of the opposed face 31B in the short direction thereof. As shown in FIG. 2, when cut along a plane that is perpendicular to the axial direction X, the convex portion 32 has a cross-section that is swollen in the shape of a circular arc along the plate thickness direction of the body portion 31 (the second plate thickness direction T2) in such a direction as to move away from the body portion 31 (upward in FIG. 2).

The support member 30 is mounted to the upper guide portion 22 from below in such a posture that the convex portion 32 is located above the body portion 31 (in a posture that is vertically reverse to that of FIG. 4). As shown in FIG. 3, in the support member 30 that is mounted to the upper guide portion 22, the convex portion 32 is almost entirely fitted in the concave portion 27 from below. In the body portion 31, the opposed face 31B is opposed to the lower face 22A of the upper guide portion 22 from below while being spaced apart therefrom, and the sliding face 31A is directed downward.

A concave portion 28 that is dented downward (downward in the second plate thickness direction T2 in a narrow sense) is provided in the upper face 23A of the lower guide portion 23, at the same position as the concave portion 27 in the axial direction X. The concave portion 28 assumes the shape of a groove that is longitudinal in the axial direction X (see FIG. 4). As shown in FIG. 3, when cut along a plane that is perpendicular to the axial direction X, the concave portion 28 has a rectangular cross-section. As shown in FIG. 4, threaded holes 29 that penetrate the lower guide portion 23 in the second plate thickness direction T2 are formed through a bottom face 28A of the concave portion 28 (a region that defines the bottom face 28A in the lower guide portion 23) at a plurality of locations (two locations in this case) that are spaced apart from one another in the axial direction X, respectively.

A support member 35 is mounted in the concave portion 28. The support member 35 constitutes part of the steering device 1, and is provided in the outer jacket 12. The support member 35 assumes the shape of a block that integrally has a body portion 36 and a convex portion 37. The body portion 36 has a rectangular cross-section that is flat in the plate thickness direction of the lower guide portion 23 (the second plate thickness direction T2), and assumes the shape of a plate that is longitudinal along the axial direction X. The body portion 36 has a sliding face 36A and an opposed face 36B. The sliding face 36A and the opposed face 36B assume the shape of an oblong that is longitudinal along the axial direction X, and extend parallel to each other while being spaced apart from each other in the second plate thickness direction T2. As shown in FIG. 4, the sliding face 36A is arranged below the opposed face 36B. Chamfer regions 38 that are inclined with respect to the sliding face 36A are provided at both ends of the sliding face 36A (in the short direction thereof) respectively. The convex portion 37 is provided on the opposed face 36B over an entire area in the longitudinal direction thereof, substantially at a central position of the opposed face 36B in the short direction thereof. As shown in FIG. 3, when cut along a plane that is perpendicular to the axial direction X, the convex portion 37 has a rectangular cross-section that is flat in the plate thickness direction of the body portion 36 (the second plate thickness direction T2). Dents 39 having a round cross-section are formed through a contact face 37A of the convex portion 37 that is located on the other side of the opposed face 36B (on a side most distant from the opposed face 36B) at a plurality of locations (at the same number of locations as in the case of the threaded holes 29 of the lower guide portion 23, and at two locations in this case) that are spaced apart from one another in the axial direction X (see FIG. 4 as well).

The support member 35 is mounted to the lower guide portion 23 from above in such a posture that the convex portion 37 is located below the body portion 36 (in a posture that is vertically reverse to that of FIG. 4). As shown in FIG. 3, in the support member 35 that is mounted to the lower guide portion 23, the convex portion 37 is almost entirely fitted in the concave portion 28 from above. In the body portion 36, the opposed face 36B is opposed to the upper face 23A of the lower guide portion 23 from above, and the sliding face 36A is directed upward. The sliding face 36A of the body portion 36 is opposed to the sliding face 31A of the body portion 31 of the support member 30, which is mounted to the upper guide portion 22, while being spaced apart therefrom in the second plate thickness direction T2. Besides, in the convex portion 37, the contact face 37A is in contact with the bottom face 28A of the concave portion 28 from above, and each of the dents 39 of the contact face 37A communicates with a corresponding one of the threaded holes 29 in the lower guide portion 23 in the second plate thickness direction T2.

Bolts 40 are assembled with the threaded holes 29 from below respectively. The bolts 40 constitute part of the steering device 1, and the number of the provided bolts 40 is the same (two in this case) as that of the threaded holes 29. When the bolts 40 are screwed into the threaded holes 29 to a certain extent respectively, tips 40A of the bolts 40 stick out from the threaded holes 29, and are fitted into the dents 39 from below, respectively. When the bolts 40 are further screwed, the tips 40A of the bolts 40 press the convex portion 37 upward in a state of being fitted in the dents 39 respectively. Therefore, the entire support member 35 is displaced upward. On the contrary, when the bolts 40 are moved reversely to the previous direction, the tips 40A of the bolts 40 move downward. Therefore, the entire support member 35 is displaced downward. In this manner, the vertical position of the support member 35 (the position thereof in the second plate thickness direction T2) can be adjusted by changing the extent to which the bolts 40 are screwed.

Besides, the steering device 1 includes a fixation bracket 41 that is fixed to the vehicle body 100, and a movable bracket 42 that is fixed to the inner jacket 11 through welding or the like. The fixation bracket 41 is also referred to as an adjustment bracket, and has a generally T-shaped cross-section as shown in FIG. 2. The fixation bracket 41 integrally has a plate-shaped fixation portion 43 that extends in the lateral direction Y, and a plate-shaped retention portion 44 that extends downward along the height direction Z (the second plate thickness direction T2 in a narrow sense), from a certain position of the fixation portion 43 in the lateral direction Y. The fixation portion 43 is thin in the second plate thickness direction T2. The retention portion 44 is thin in the lateral direction Y (the first plate thickness direction T1). Therefore, the plate thickness direction of the retention portion 44 is the first plate thickness direction T1. Referring to FIG. 3, both a left lateral face 44L of the retention portion 44 and a right lateral face 44R of the retention portion 44 are flat along the axial direction X and the height direction Z. A vertically long groove 45

(a tilt guide groove) that is long in the height direction Z is formed through the retention portion 44 in such a manner as to penetrate in the lateral direction Y (the first plate thickness direction T1). The vertically long groove 45 is a long hole that is long in the height direction Z, and may assume the shape of a circular arc along a turning locus of the column jacket 5, or assume the shape of a straight line close to the turning locus (see FIG. 1). The insertion hole 26 of the first plate-shaped region 21 in the outer jacket 12 overlaps with a certain region of the vertically long groove 45, as viewed from the lateral direction Y.

The retention portion 44 is located to the left of the first plate-shaped region 21 of the outer jacket 12. The right lateral face 44R of the retention portion 44 is opposed to the left lateral face 21L of the first plate-shaped region 21 from the left side. The movable bracket 42 is also referred to as a distance bracket, and is a groove-shaped (generally U-shaped) member that opens rightward. In a state of being fixed to the inner jacket 11, the movable bracket 42 is accommodated in the outer jacket 12. The movable bracket 42 integrally has a second plate-shaped region 52, an upward inclined portion 53, an upper guide portion 54, a downward inclined portion 55, a lower guide portion 56, and a reinforcement portion 57.

Referring to FIG. 3, the second plate-shaped region 52 is thin in the lateral direction Y (the first plate thickness direction T1), and assumes the shape of a plate that extends along the axial direction X. That is, the plate thickness direction of the second plate-shaped region 52 is the first plate thickness direction T1. Both a left lateral face 52L of the second plate-shaped region 52 and a right lateral face 52R of the second plate-shaped region 52 are flat along the axial direction X and the second plate thickness direction T2 (the height direction Z). The second plate-shaped region 52 is arranged to the right of the first plate-shaped region 21 of the outer jacket 12. In this state, the left lateral face 52L of the second plate-shaped region 52 is parallel to and opposed to the right lateral face 21R of the first plate-shaped region 21 from the right side. That is, the second plate-shaped region 52 is arranged opposite the first plate-shaped region 21 such that a direction of plate thickness of the first plate-shaped region 21 is same as a direction of plate thickness of the second plate-shaped region 52. Besides, since the retention portion 44 is located to the left of the first plate-shaped region 21 as described above, the first plate-shaped region 21 is located between the retention portion 44 and the second plate-shaped region 52 in the lateral direction Y (the first plate thickness direction T1). A relationship among the first plate-shaped region 21, the second plate-shaped region 52, and the retention portion 44 will now be described focusing attention on the retention portion 44. The retention portion 44 is arranged on the other side of the first plate-shaped region 21 with respect to the second plate-shaped region 52.

A guide groove 58 that is long in the axial direction X is formed through the second plate-shaped region 52 in such a manner as to penetrate in the lateral direction Y (the first plate thickness direction T1). Incidentally, although not shown in the drawings, a protrusion portion that protrudes into the guide groove 58 is provided in the guide groove 58 at a certain position in the longitudinal direction thereof. The insertion hole 26 of the first plate-shaped region 21 overlaps with a certain region of the guide groove 58, as viewed from the lateral direction Y. A guide member 59 is mounted in the guide groove 58 from the right side.

The guide member 59 assumes the shape of a plate that is thin in the lateral direction Y, and integrally has a body portion 60 and a fitting portion 61. The body portion 60 assumes the shape of a plate that is thin in the lateral direction Y, and both a left lateral face 60L of the body portion 60 and a right lateral face 60R of the body portion 60 are flat along the axial direction X and the height direction Z. The fitting portion 61 assumes the shape of a plate that is thin in the lateral direction Y, and protrudes leftward from the left lateral face 60L of the body portion 60 substantially at a center thereof in the height direction Z. The thickness (the dimension in the first plate thickness direction T1) of the fitting portion 61 is smaller than the thickness of the second plate-shaped region 52. A left lateral face 61L of the fitting portion 61 is flat along the axial direction X and the height direction Z.

A horizontally long groove 62 (a telescopic guide groove) that is long in the axial direction X is formed in the guide member 59 (see FIG. 1 as well). The horizontally long groove 62 penetrates both the body portion 60 and the fitting portion 61 in the lateral direction Y (the first plate thickness direction T1). The longitudinal dimension of the horizontally long groove 62 is shorter than the longitudinal dimension of the guide groove 58. In the guide member 59 that is mounted in the guide groove 58, the fitting portion 61 is fitted in the guide groove 58 from the right side, and the left lateral face 61L of the fitting portion 61 is substantially flush with the left lateral face 52L of the second plate-shaped region 52. Besides, the left lateral face 60L of the body portion 60 is in surface contact with the right lateral face 52R of the second plate-shaped region 52 from the right side. It should be noted herein that in a state of being fitted in the guide groove 58, the fitting portion 61 is sandwiched by one end edge of the guide groove 58 in the longitudinal direction thereof (that part of the second plate-shaped region 52 which rims the one end edge) and the protrusion portion (not shown) that protrudes into the guide groove 58 as described above in the axial direction X. Therefore, the guide member 59 cannot move in the axial direction X in the guide groove 58, and is fixed to the movable bracket 42. In this state, the insertion hole 26 of the first plate-shaped region 21 overlaps with a certain region of the horizontally long groove 62 in the guide member 59, as viewed from the lateral direction Y. As described above, the insertion hole 26 also overlaps with a certain region of the vertically long groove 45, as viewed from the lateral direction Y. Therefore, the vertically long groove 45 and the horizontally, long groove 62 intersect with each other in the insertion hole 26 as viewed from the lateral direction Y, and are linked with each other via the insertion hole 26.

The upward inclined portion 53 assumes the shape of a plate that extends rightward and upward in an inclined manner from an upper end of the second plate-shaped region 52, and is opposed to the aforementioned upper inclined face 24 of the outer jacket 12 from a lower right side while being spaced apart therefrom. The upper guide portion 54 assumes the shape of a plate that extends rightward from an upper right end of the upward inclined portion 53. A right end of the upper guide portion 54 is slightly bent rightward and upward, and is fixed to a left region of an outer peripheral face of the inner jacket 11 through welding or the like. An upper face 54A as that region of the upper guide portion 54 which is located to the left of the right end thereof is flat along the axial direction X and the lateral direction Y. The upper face 54A is parallel to the sliding face 31A of the support member 30 that is mounted to the upper guide portion 22 of the outer jacket 12, and is in surface contact with the sliding face 31A from below in the second plate thickness direction T2. Since the inner jacket 11 moves relatively to the outer jacket 12 in the axial direction X, the support member 30 on the outer jacket 12 side slidably supports the movable bracket 42 on the inner jacket 11 side, on the sliding face 31A. Besides, in the support member 30, the convex portion 32 is almost entirely fitted in the concave portion 27 of the outer jacket 12 from below, and the support member 30 is positioned with respect to the outer jacket 12 such that the circular arc of the convex portion 32 coincides with the circular arc of the concave portion 27. Thus, the support member 30 is mounted to the outer jacket 12 at a normal mounting position, such that the movable bracket 42 can be reliably supported in a slidable manner.

The downward inclined portion 55 assumes the shape of a plate that extends rightward and downward in an inclined manner from a lower end of the second plate-shaped region 52, and is opposed to the aforementioned lower inclined face 25 of the outer jacket 12 from an upper right side while being spaced apart therefrom. The lower guide portion 56 assumes the shape of a plate that extends rightward from an upper right end of the downward inclined portion 55. A right end of the lower guide portion 56 is slightly bent rightward and downward, and is fixed to the left region of the outer peripheral face of the inner jacket 11 through welding or the like. A lower face 56A as that region of the lower guide portion 56 which is located to the left of the right end thereof is flat along the axial direction X and the lateral direction Y. The lower face 56A is parallel to the sliding face 36A of the support member 35 that is mounted to the lower guide portion 23 of the outer jacket 12, and is in surface contact with the sliding face 36A from above in the second plate thickness direction T2. Since the inner jacket 11 moves relatively to the outer jacket 12 in the axial direction X, the support member 35 on the outer jacket 12 side slidably supports the movable bracket 42 on the inner jacket 11 side, on the sliding face 36A.

It should be noted herein that the vertical position (the position in the second plate thickness direction T2) of the support member 35 can be adjusted by changing the extent to which the bolts 40 are screwed as described above. For example, when the bolts 40 that are assembled with the threaded holes 29 are screwed in a predetermined direction, the tips 40A of the bolts 40 stick out from the threaded holes 29 respectively, and press the support member 35 toward the movable bracket 42 from below. Therefore, the support member 35 is displaced upward. When the bolts 40 are returned reversely to the predetermined direction, the support member 35 is displaced downward. In this manner, the position of the support member 35 relative to the movable bracket 42 in the second plate thickness direction T2 can be adjusted. That is, the threaded holes 29 and the bolts 40 constitute an adjustment mechanism 85 for adjusting the position of the support member 35 relative to the movable bracket 42 in the second plate thickness direction T2. Incidentally, there are vertical and lateral gaps between the support member 35 and the lower guide portion 23 (an inner peripheral face in which the concave portion 28 is formed and the upper face 23A). Therefore, the support member 35 can move with the convex portion 37 fitted in the concave portion 28. Thus, the support member 35 can be positioned (aligned).

Besides, it is apparent that if the support member 30 and the support member 35 are regarded as identical support members, these support members are provided on both sides of the movable bracket 42 in the second plate thickness direction T2 respectively. The reinforcement portion 57 is formed by bending a plate, and has a generally M-shaped cross-section that is inclined leftward by 90° in FIG. 2. The reinforcement portion 57 is fixed to the left region of the outer peripheral face of the inner jacket 11 through welding or the like, while being sandwiched by the upper guide portion 54 and the lower guide portion 56 from the height direction Z (the second plate thickness direction T2 in a narrow sense). The reinforcement portion 57 in this state is opposed to the second plate-shaped region 52 and the guide member 59 from the right side, while being spaced apart therefrom. The reinforcement portion 57 reinforces the entire movable bracket 42 between the upper guide portion 54 and the lower guide portion 56.

Besides, the steering device 1 includes a press contact/release portion 66. The press contact/release portion 66 locks the posture of the column jacket 5 to fix the adjusted position of the steering member 2, and unlocks the column jacket 5 to adjust the position of the steering member 2. The press contact/release portion 66 includes a fastening shaft 70, a cam 71, a cam follower 72, and a pressing member 73.

The fastening shaft 70 is a shaft-shaped body that extends in the lateral direction Y (the first plate thickness direction T1). The fastening shaft 70 is inserted from the left side through an overlapping region (including the insertion hole 26 as well) of the vertically long groove 45 in the retention portion 44 of the fixation bracket 41 and the horizontally long groove 62 of the guide member 59 that is fixed to the movable bracket 42. A width across flat part or the like is formed on that region of the fastening shaft 70 which is fitted in the horizontally long groove 62.

A left end of the fastening shaft 70 sticks out leftward from the vertically long groove 45. A screw portion (not shown) is formed on an outer peripheral face of the left end, and a nut 74 is assembled with the screw portion. An operation lever 75 is coupled to the left end of the fastening shaft 70. The operation lever 75 assumes the shape of a long rod or a long plate, and a through-hole 75A is formed at one end thereof. The nut 74 and the operation lever 75 constitute part of the steering device 1. The left end of the fastening shaft 70 is inserted through the through-hole 75A, and the nut 74 is assembled with the screw portion (that region which is located to the left of the through-hole 75A), whereby the operation lever 75 is fixed to the left end of the fastening shaft 70. Incidentally, a needle bearing 76 may be interposed between the operation lever 75 and the nut 74.

By being gripped and vertically twisted, the operation lever 75 can be rotated around an axis C of the fastening shaft 70 (around the shaft). Incidentally, the sliding face 31A of the aforementioned support member 30 and the sliding face 36A of the aforementioned support member 35 are substantially equidistant from the axis C. The cam 71 and the cam follower 72 assume the shape of a ring, and are externally fitted to the fastening shaft 70.

The cam 71 is arranged in such a manner as to extend along a right lateral face of the operation lever 75, on the outside (on the left side) of the left lateral face 44L of the retention portion 44 of the fixation bracket 41. The cam 71 is fixed to the operation lever 75, and can rotate integrally with the operation lever 75. The cam follower 72 integrally has a plate portion 77 and a boss 78. The plate portion 77 assumes the shape of a plate that is thin in the lateral direction Y (the first plate thickness direction T1). Therefore, the plate thickness direction of the plate portion 77 is the first plate thickness direction T1. A right lateral face 77R of the plate portion 77 is flat along the axial direction X and the height direction Z. The right lateral face 77R of the plate portion 77 is in surface contact with the left lateral face 44L of the retention portion 44 of the fixation bracket 41 (that region which rims the vertically long groove 45), from the left side. A round hole 77A that penetrates the plate portion 77 in a thickness direction thereof (the lateral direction Y) is formed therethrough.

The boss 78 assumes the shape of a cylinder that extends rightward while surrounding the round hole 77A. Therefore, the round hole 77A and a hollow region 78A of the boss 78 are continuous with each other in the lateral direction Y. A left region of the fastening shaft 70 is inserted through the round hole 77A and the hollow region 78A. The boss 78 is fitted in the vertically long groove 45 of the retention portion 44 of the fixation bracket 41 from the left side, and can move in the vertically long groove 45 along a longitudinal direction (a lengthwise direction) of the vertically long groove 45. A width across flat part or the like is formed in that region of the boss 78 which is fitted in the vertically long groove 45. Thus, the vertically long groove 45 prevents the cam follower 72 from idling (rotating together with the fastening shaft 70). On the other hand, the fastening shaft 70 that is inserted through the cam follower 72 cannot rotate relatively to the cam follower 72. Besides, the cam follower 72 can move relatively to (slide with respect to) the fastening shaft 70 in the lateral direction Y, in a state of being externally fitted to the fastening shaft 70.

Cam protrusions 79 are formed on opposed faces of the cam 71 and the cam follower 72 (a right lateral face of the cam 71 and a left lateral face of the cam follower 72) respectively. The cam protrusion 79 of the cam 71 protrudes rightward toward the cam follower 72, and the cam protrusion 79 of the cam follower 72 protrudes leftward toward the cam 71. The pressing member 73 is fixed to a right end face of the fastening shaft 70. The pressing member 73 assumes the shape of a plate that is thin in the lateral direction Y (the first plate thickness direction T1). Therefore, the plate thickness direction of the pressing member 73 is the first plate thickness direction T1. A left lateral face 73L of the pressing member 73 is flat along the axial direction X and the height direction Z. The pressing member 73 is located to the right of the guide member 59, and the left lateral face 73L of the pressing member 73 is in surface contact with the right lateral face 60R of the body portion 60 of the guide member 59 from the right side. Incidentally, the aforementioned reinforcement portion 57 is located at a right position that is spaced apart from the pressing member 73 by a predetermined distance.

As described above, the boss 78 of the cam follower 72 can move along the longitudinal direction of the vertically long groove 45. In addition, in a state of extending in the lateral direction Y, the fastening shaft 70 is inserted through the hollow region of the cam follower 72. The fastening shaft 70 is inserted through the horizontally long groove 62 of the guide member 59 as well. Therefore, while maintaining a posture of extending in the lateral direction Y, the fastening shaft 70 can relatively move along the longitudinal direction of each of the vertically long groove 45 and the horizontally long groove 62.

With the posture of the column jacket 5 locked, the cam protrusion 79 of the cam 71 and the cam protrusion 79 of the cam follower 72 are opposed to each other in the lateral direction Y as shown in FIGS. 2 and 3, and the cam follower 72 is spaced apart from the cam 71 to the right side. Thus, the gap between the right lateral face 77R of the plate portion 77 of the cam follower 72 and the left lateral face 73L of the pressing member 73 in the lateral direction Y (the first plate thickness direction T1) is narrowed. In this state, the plate portion 77 and the pressing member 73 sandwich the retention portion 44 of the fixation bracket 41, the first plate-shaped region 21 of the outer jacket 12, and the second plate-shaped region 52 of the movable bracket 42 (including the guide member 59 as well) from the lateral direction Y. Therefore, while being in press contact with each other in the first plate thickness direction T1, the first plate-shaped region 21 and the second plate-shaped region 52 are pressed against the retention portion 44 located on the left side. Thus, the fixation bracket 41 and the outer jacket 12 are relatively immovably in press contact with each other, and the movable bracket 42 and the outer jacket 12 are relatively immovably in press contact with each other. In consequence, both the aforementioned telescopic adjustment and the aforementioned tilt adjustment are prohibited, and the posture of the column jacket 5 is locked.

When the operation lever 75 is operated to be rotated in one direction in this state, the cam protrusion 79 of the cam 71 and the earn protrusion 79 of the cam follower 72 are not opposed to each other in the lateral direction Y, and the cam follower 72 is displaced leftward in such a manner as to approach the cam 71, as opposed to the cases of FIGS. 2 and 3. Thus, the gap between the right lateral face 77R of the plate portion 77 of the cam follower 72 and the left lateral face 73L of the pressing member 73 in the lateral direction Y is widened. Therefore, both the press contact between the fixation bracket 41 (the retention portion 44) and the outer jacket 12 (the first plate-shaped region 21) and the press contact between the movable bracket 42 (the second plate-shaped region 52) and the outer jacket 12 are released. Thus, the fastening shaft 70 that is partially inserted through the hollow region of the cam follower 72 is allowed to move relatively along the longitudinal direction of each of the vertically long groove 45 and the horizontally long groove 62. Due to the foregoing, the column jacket 5 is unlocked.

When the fastening shaft 70 moves relatively along the longitudinal direction of the vertically long groove 45 with the column jacket 5 unlocked, the movable bracket 42 (the inner jacket 11) and the outer jacket 12 move together with the fastening shaft 70, whereby the entire column jacket 5 tilts. Thus, the aforementioned tilt adjustment can be made. When the column jacket 5 tilts, the vertically long groove 45 guides the movements of the movable bracket 42 and the outer jacket 12. It should be noted herein that the longitudinal dimension of the vertically long groove 45 represents a range in which the column jacket 5 can tilt.

Besides, when the fastening shaft 70 moves relatively to the movable bracket 42 along the longitudinal direction of the horizontally long groove 62 (which is the same as the axial direction X), the fastening shaft 70 actually remains stationary, and the movable bracket 42 and the inner jacket 11 move along the longitudinal direction of the horizontally long groove 62. Thus, the entire column jacket 5 telescopically moves, so that the aforementioned telescopic movement can be made. When the column jacket 5 telescopically moves, the horizontally long groove 62 guides the movements of the movable bracket 42 and the inner jacket 11. It should be noted herein that the longitudinal dimension of the horizontally long groove 62 represents a range in which the column jacket 5 can telescopically move.

Incidentally, in the event of a secondary collision, the guide member 59 can climb over the protrusion portion (not shown) that protrudes into the guide groove 58 (of the movable bracket 42), and move in the axial direction X in the guide groove 58. Thus, the range in which the column jacket 5 can telescopically move is enlarged, and the impact of the secondary collision can be softened. Then, when the operation lever 75 is operated to be rotated reversely to the aforementioned one direction with the column jacket 5 unlocked, the cam protrusion 79 of the cam 71 and the cam protrusion 79 of the cam follower 72 are opposed to each other in the lateral direction Y, and the cam follower 72 moves away from the cam 71 to the right side, as shown in FIGS. 2 and 3. Thus, the gap between the right lateral face 77R of the plate portion 77 of the cam follower 72 and the left lateral face 73L of the pressing member 73 in the lateral direction Y is narrowed. Thus, the fixation bracket 41 and the outer jacket 12 are brought into press contact with each other, and the movable bracket 42 and the outer jacket 12 are brought into press contact with each other, so that the posture of the column jacket 5 is locked again.

In this manner, the press contact/release portion 66, which includes the fastening shaft 70, the cam 71, the cam follower 72, and the pressing member 73, brings the first plate-shaped region 21 and the second plate-shaped region 52 into press contact with each other along the plate thickness direction (the first plate thickness direction T1) to press the first plate-shaped region 21 and the second plate-shaped region 52 against the retention portion 44, and releases the first plate-shaped region 21 and the second plate-shaped region 52 from a state of being in press contact with each other and a state of being pressed against the retention portion 44. As described above, in the steering device 1, when the press contact/release portion 66 has released the first plate-shaped region 21 and the second plate-shaped region 52 from the state of being in press contact with each other and the state of being pressed against the retention portion 44, at least one of the telescopic adjustment and the tilt adjustment can be made.

On the other hand, it is assumed that the first plate-shaped region 21 (on the outer jacket 12 side) and the second plate-shaped region 52 (on the inner jacket 11 side) are pressed against the retention portion 44 (on the vehicle body 100 side) along the first plate thickness direction T1 while being kept in press contact with each other along the plate thickness direction of each of the first plate-shaped region 21 and the second plate-shaped region 52 (the first plate thickness direction T1) by the press contact/release portion 66. In this case, no gap (which serves as a spring element) is created in a direction of application of a force from the press contact/release portion 66 (an axial force of the fastening shaft 70) (the first plate thickness direction T1), between adjacent ones of the first plate-shaped region 21, the second plate-shaped region 52 and the retention portion 44. Therefore, the steering device 1 whose posture is locked can be increased in rigidity. Besides, if the first plate-shaped region 21 and the second plate-shaped region 52 are simply pressed against the retention portion 44 while being kept in press contact with each other along the first plate thickness direction T1, these members are easily regulated (the accuracies thereof are easily regulated).

It should be noted herein that the support members 30 and 35 can restrain the movable bracket 42 and the inner jacket 11 from backlashing in the second plate thickness direction T2. In particular, since the support members 30 and 35 are provided on both the sides of the movable bracket 42 respectively, the movable bracket 42 and the inner jacket 11 can further be restrained from backlashing in the second plate thickness direction T2. Thus, the steering device 1 can farther be increased in rigidity, and the slidability between the outer jacket 12 and the inner jacket 11 can also be increased.

In addition, the support member 30 can be accurately mounted to the outer jacket 12 by the positioning portion that is simply constituted by the concave portion 27 (on the outer jacket 12 side) and the convex portion 32 (on the support member 30 side), each of which has a cross-section in the shape of a circular arc. For more detail, when the convex portion 32 is fitted into the concave portion 27, the support member 30 is automatically positioned with respect to (aligned with) the outer jacket 12.

Furthermore, the movable bracket 42 and the inner jacket 11 can further be restrained from backlashing in the second plate thickness direction T2, by adjusting the position of the support member 35 through the use of the adjustment mechanism 85. The adjustment mechanism 85 can be simply constituted by the threaded holes 29 of the outer jacket 12 and the bolts 40 that are assembled with these threaded holes 29 to press the support member 35. Therefore, if the fastening torque of each of the bolts 40 for a corresponding one of the threaded holes 29 is eventually regulated, the backlash can be individually eliminated and the aforementioned rigidity and slidability can be increased without being affected by the press contact/release portion 66, even in the case where the accuracy of that region of the movable bracket 42 which slides with respect to the support members 30 and 35 (the upper face 54A of the upper guide portion 54 and the lower face 56A of the lower guide portion 56 as described above) disperses. In the case where the backlash is eventually thus eliminated, the accuracy of that region of the movable bracket 42 which slides with respect to the support members 30 and 35 need not be strictly determined. Therefore, there is also a merit that the cost of manufacturing can be reduced.

In this manner, in this steering device 1, the axial force of the fastening shaft 70 (a force with which the press contact/release portion 66 keeps the fixation bracket 41, the movable bracket 42 and the outer jacket 12 in press contact with one another) is entirely received in the plate thickness direction of the first plate-shaped region 21 and the second plate-shaped region 52 (the first plate thickness direction T1). On the other hand, the members for stopping backlash in the second plate thickness direction T2 are separately provided as the support members 30 and 35. Thus, it is possible to separate the configuration for transmitting the axial force and the configuration for stopping backlash from each other, increase the aforementioned rigidity and slidability, and adjust the function of transmitting the axial force and the function of stopping backlash independently of each other.

Figure 5:
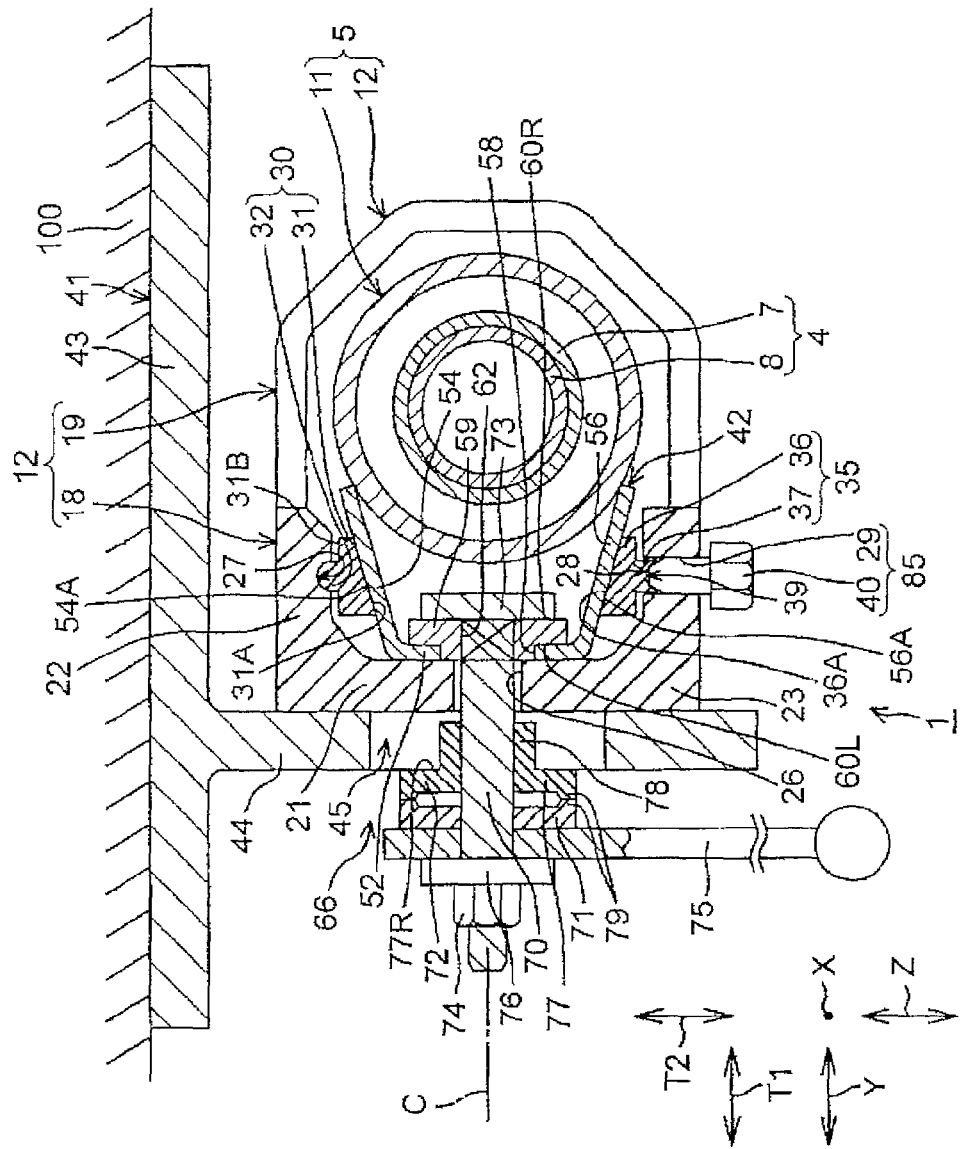
FIG. 5 is a view of a modification example that is applied to FIG. 2.

It should be noted herein that the rigidity and slidability can be increased simply by fastening the two bolts 40 and the single nut 74 to one another at a total of three locations. This invention is not limited to the above-described embodiment thereof, but can be modified in various manners within the scope defined by the claims. For example, the sliding faces between the respective support members 30 and 35 and the movable bracket 42 (the sliding face 31A, the sliding face 36A, the upper face 54A of the upper guide portion 54, and the lower face 56A of the lower guide portion 56) are flat along the lateral direction Y (the first plate thickness direction T1) in the case of FIGS. 2 and 3. Instead, the sliding faces may be tapered in such a manner as to be inclined with respect to the lateral direction Y as shown in FIG. 5, and the movable bracket 42 may be in contact with the support members 30 and 35 wedgewise. Then, when the press contact/release portion 66 releases the first plate-shaped region 21 and the second plate-shaped region 52 from a state of being in press contact with each other and a state of being pressed against the retention portion 44, a gap is definitely created between each of the support members 30 and 35 and the movable bracket 42. Therefore, the slidability between each of the support members 30 and 35 and the movable bracket 42 is improved. Besides, a plurality of support members 35 may be provided and arranged side by side in the axial direction X. Then, the follow-up performance of the support members 35 as a whole with respect to the movable bracket 42 is improved by adjusting the positions of the individual support members 35 by the bolts 40. Therefore, the aforementioned elimination of backlash can be realized with higher accuracy, and the aforementioned rigidity and slidability can further be increased. Incidentally, a plurality of support members 30 may be provided.

Besides, the concave portion 28 of the lower guide portion 23 and the convex portion 37 of the support member 35 may have a cross-section in the shape of a circular arc, as is the case with the concave portion 27 of the upper guide portion 22 and the convex portion 32 of the support member 30. Besides, the support member 30 may be provided with the aforementioned adjustment mechanism 85. In addition, in the foregoing embodiment of the invention, the fastening shaft 70 moves along the longitudinal direction of each of the vertically long groove 45 and the horizontally long groove 62, whereby the column jacket 5 can be adjusted both tiltably and telescopically. However, it is also appropriate to adopt a configuration in which only one of a tilt adjustment and a telescopic adjustment can be made by forming one of the vertically long groove 45 and the horizontally long groove 62 as a round hole instead of a long hole. That is, it is sufficient that the column jacket 5 can be adjusted at least either tiltably or telescopically.

What is claimed is:

1. A steering device comprising:
a steering shaft having one end at which a steering member is mounted;
a hollow inner jacket accommodating the steering shaft and movable in an axial direction of the steering shaft;
a column jacket having a first plate-shaped region extending parallel to the axial direction, the column jacket including an outer jacket that covers the inner jacket from outside, the column jacket rotatably supporting the steering shaft and being adjustable at least one of telescopically and tiltably;
a movable bracket having a second plate-shaped region arranged opposite the first plate-shaped region such that a direction of plate thickness of the first plate-shaped region is same as a direction of plate thickness of the second plate-shaped region, the movable bracket being fixed to the inner jacket;
a fixation bracket having a retention portion arranged on an opposite side of the first plate-shaped region relative to the second plate-shaped region, the fixation bracket being fixed to a vehicle body; and
a press contact/release portion that brings the first plate-shaped region and the second plate-shaped region into press contact with each other along the plate thickness direction to press the first plate-shaped region and the second plate-shaped region against the retention portion, and releases the first plate-shaped region and the second plate-shaped region from a state of being in press contact with each other and being pressed against the retention portion.

2. The steering device according to claim 1, further comprising:
a support member provided on the outer jacket, the support member slidably supporting the movable bracket from an orthogonal direction that is perpendicular to both the axial direction and the plate thickness direction.

3. The steering device according to claim 2, wherein
the support member is provided on each of both sides of the movable bracket in the orthogonal direction.

4. The steering device according to claim 2, further comprising:
a positioning portion that positions the support member with respect to the outer jacket.

5. The steering device according to claim 4, wherein
the positioning portion includes a concave portion that is provided in the outer jacket and has a circularly dented cross-section, and a convex portion that is provided on the support member, has a circularly swollen cross-section, and is fitted in the concave portion.

6. The steering device according to claim 2, further comprising:
an adjustment mechanism that adjusts a position of the support member relative to the movable bracket in the orthogonal direction.

7. The steering device according to claim 6, wherein
the adjustment mechanism includes a threaded hole formed through the outer jacket, and a bolt that is assembled with the threaded hole and presses the support member from the threaded hole toward the movable bracket.

8. The steering device according to claim 1, wherein
when the first plate-shaped region and the second plate-shaped region are in the state of being in press contact with each other and being pressed against the retention portion, no gap is
provided between the first plate-shaped region and the second plate-shaped region in the plate thickness direction, and no gap is provided between the first plate-shaped region and the retention portion in the plate thickness direction.

* * * * *